United States Patent [19]

Lee et al.

[11] Patent Number: 4,899,373

[45] Date of Patent: Feb. 6, 1990

[54] METHOD AND APPARATUS FOR PROVIDING PERSONALIZED TELEPHONE SUBSCRIBER FEATURES AT REMOTE LOCATIONS

[75] Inventors: Chinmei C. Lee, Woodridge; Stephen A. McGaw, Schaumburg, both of Ill.

[73] Assignee: American Telephone and Telegraph Company AT&T Bell Laboratories, Murray Hill, N.J.

[21] Appl. No.: 935,812

[22] Filed: Nov. 28, 1986

[51] Int. Cl.[4] .......................... H04M 3/44; H04M 7/14
[52] U.S. Cl. .................................... 379/207; 379/144; 379/201; 379/216
[58] Field of Search .................... 379/36, 91, 144, 207, 379/201, 211, 216, 357

[56] References Cited

U.S. PATENT DOCUMENTS

| | | | |
|---|---|---|---|
| 3,363,063 | 1/1968 | Kandel et al. | 379/211 |
| 3,691,301 | 9/1972 | Zarouni | 379/114 |
| 4,162,377 | 7/1979 | Mearns | 379/127 |
| 4,191,860 | 3/1980 | Weber | 379/115 |
| 4,752,951 | 6/1988 | Konneker | 379/211 |
| 4,759,056 | 7/1988 | Akiyama | 379/197 |

FOREIGN PATENT DOCUMENTS

| | | | |
|---|---|---|---|
| 3018218 | 11/1981 | Fed. Rep. of Germany | 379/201 |
| 0127352 | 8/1982 | Japan | 379/201 |
| 0206272 | 12/1983 | Japan | 379/201 |
| 0211358 | 11/1984 | Japan | 379/357 |
| 0001959 | 1/1985 | Japan | 379/357 |
| 0103858 | 6/1985 | Japan | 379/144 |
| 0103859 | 6/1985 | Japan | 379/144 |
| 0180268 | 9/1985 | Japan | 379/201 |
| 0179645 | 8/1986 | Japan | 379/357 |
| 0280148 | 12/1986 | Japan | 379/357 |

OTHER PUBLICATIONS

"Switching in a Network of Networks", F. T. Andrews, Jr., Telephony, 5/28/84, pp. 43, 45, 46, 50 (Part 1) and 6/4/84, pp. 58, 60, 64, 66 (Part 2).
"Card Reading Phones Give Travelers a Lift", Telephone Engineer & Management, Feb. 1, 1986, pp. 94–96.
"ISDN in the Office-HICOM", Special Issue, Telcom Report and Siemens Magazine COM, Dec. 1985, Siemens Aktiengesellschaft, pp. 6–110.

Primary Examiner—Thomas W. Brown
Attorney, Agent, or Firm—Peter Visserman

[57] ABSTRACT

Personalized telephone features are made available to subscribers away from their home base. A nationally accessible data base system stores feature data in association with personal identification numbers. A subscriber wishing to use personalized features while away from the home base dials a special code from a station connected to any exchange which has access to the data base and presents the personal identification number. The corresponding feature data is retrieved from the data base and stored in the exchange in association with the station from which the request was initiated and telephone service will be rendered in that exchange with the subscriber's personalized telephone features. A temporary office arrangement may be established in which the personalized features will be immediately available on incoming and outgoing calls for a period of time specified by the subscriber. In one embodiment the feature data is stored on a credit card and transmitted to the exchange by a card reader. The feature data is stored in the exchange and the features are made available to the subscriber without having to access a data base.

17 Claims, 5 Drawing Sheets

| INFORMATION FIELD | CONTENT |
|---|---|
| CARD NUMBER | 31297928951234 |
| FEATURE VALIDITY | 11010100 |
| SPEED NUMBER 1 | 3129795582 |
| SPEED NUMBER 2 | 3129796000 |
| SPEED NUMBER 3 | |
| SPEED NUMBER 4 | |
| LONG DISTANCE CARRIER | XXX |

DATA BASE STRUCTURE

FIG. 2

| BIT | INDICATION |
|---|---|
| 1 | FEATURE TRANSFER |
| 2 | SPEED CALLING |
| 3 | DIAL CALL WAITING |
| 4 | CONFERENCE CALLING |
| 5 | CALL HOLD |
| 6 | TEMPORARY OFFICE |
| 7 | FUTURE USE |
| 8 | FUTURE USE |

FEATURE VALIDITY FIELD

FIG. 3

METHOD AND APPARATUS FOR PROVIDING PERSONALIZED TELEPHONE SUBSCRIBER FEATURES AT REMOTE LOCATIONS

BACKGROUND OF THE INVENTION

1. Field of the Invention

The invention relates to telecommunication switching systems, and more particularly, to providing a subscriber with personalized telecommunications features for calls made from stations remote from the subscriber's home base.

2. Description of the Prior Art

A wide variety of convenient features are available to enhance the usefulness of the telephone to subscribers, including such features as speed calling, call waiting, conference calling and the like. In prior art systems, data defining subscribed features are recorded in a feature data block associated with the subscriber's home base telephone in the telephone exchange to which the subscriber's home base is connected. The local exchange consults the recorded data to determine what service features should be provided to calls originating from and terminating on the subscriber's home base telephone. A problem of prior art systems is that the telephone features of an individual subscriber are available only at the subscriber's home base and not, for example, when the subscriber places a call from a pay station or other remote locations such as a hotel room, connected to another telephone exchange. One prior art publication suggests a class of service transfer feature in an office communication system.

SUMMARY OF THE INVENTION

The prior art problems are solved and an advance in the art is made in accordance with the principles of this invention by providing personalized features on the basis of personal identification of the subscriber. In accordance with this invention, data defining a subscriber's personalized set of telecommunication features is temporarily stored in a local exchange in association with any subscriber line on which the subscriber is identified. In one embodiment of the invention, personalized feature data is stored in a data base remote from the local exchange together with a subscriber's personal identification number such as a credit card number. The receipt of a subscriber's personal identification number causes the data base to be searched and causes the retrieved personalized feature data to be entered in the exchange serving the subscriber line from which the personal identification number was received. Advantageously, the personalized feature data may be stored in a nationally accessible data base allowing the subscriber to have the features available in other cities.

In one embodiment of the invention, the feature data includes a speed calling list. Advantageously, this allows a subscriber to use abbreviated dialing from the remote location.

In one specific embodiment, the subscriber may supply data defining a duration to the remote telephone exchange, which causes the exchange to retain the data in association with the affected line for the defined time period. Advantageously, this provides a convenient way to set up a temporary office telephone away from the home base and conveniently allows features relating to incoming calls, such as call screening, to be applied to the temporary office phone.

In an alternative embodiment, the personalized feature data is carried by the subscriber, for example, on a credit card which may be read by a card reader. The data from the credit card is transmitted over a subscriber line to the local exchange where it is temporarily stored in association with the subscriber line from which it is received. Advantageously, in this arrangement no separate data base is required.

BRIEF DESCRIPTION OF THE DRAWING

The invention may be better understood from the following detailed description when read with reference to the drawing in which:

FIGS. 2 and 3 define data fields in the data base system; and

DETAILED DESCRIPTION

Figure 1:
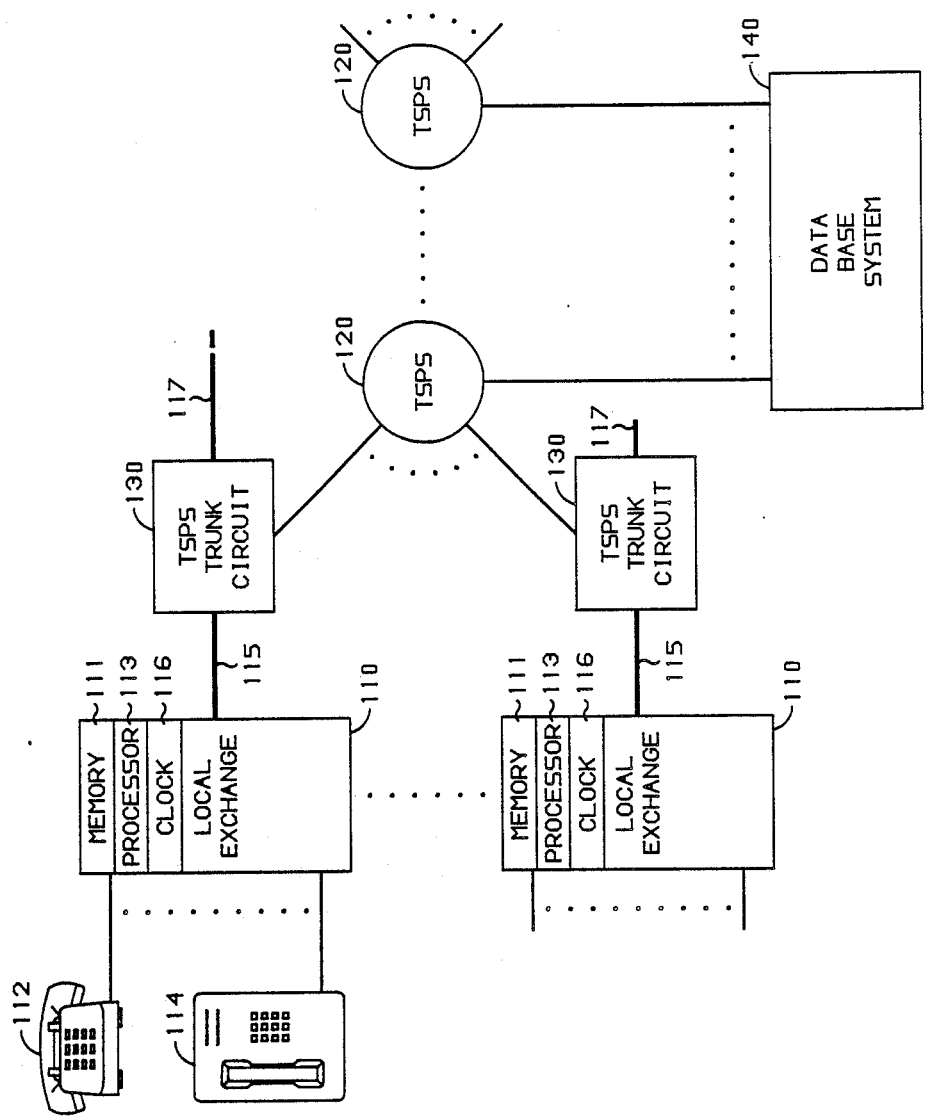
FIG. 1 shows a local telephone exchange together with a data base system accessible from a plurality of local exchanges.

FIG. 1 shows an illustrative embodiment in which several local exchanges 110 are connected via traffic service position system (TSPS) 120 to a common data base system 140. Connected to each local exchange are a plurality of telephone station terminals, such as set 112 which may be any standard and well-known subscriber set. Also shown in FIG. 1 is a telephone set 114 incorporating a card reader. This, for example, may be a coin phone incorporating a card reader such as may be found at airports and which are commercially available. The card reader in the commercially available arrangements is particularly adapted for reading a credit card and transmitting the data from the credit card to the local exchange. The local exchanges are each controlled by an internal processor 113 which has access to a local memory 111 for storing feature data in association with a subscriber terminal (e.g., 112). A clock arrangement 116 in the local exchange provides signals used for defining time when a subscriber requests service for a specified period of time. Each local exchange 110 is connected to a TSPS trunk circuit 130 in a standard fashion by means of trunk 115. The TSPS trunk circuit 130 may be connected to an interexchange carrier switch, commonly referred to as a toll office, by means of trunk 117. The traffic service position system (TSPS) 120 is a switch system which in this embodiment is used to provide access to the common data base system 140. Numerous data base access systems are known and for the purposes of this invention, any acceptable system providing access from local exchanges to a common data base 140 may be used.

The local exchange may be, for example, the well-known 5ESS ™ switch developed by AT&T and described in the *AT&T Technical Journal*, July-August, 1985, Vol. 64, No. 6, Part 2. The local exchange communicates with the connected stations 112, 114 and the TSPS in a well-known manner. The TSPS 120 may, for example, be the TSPS No. 1B developed by AT&T and described in *The Bell System Technical Journal*, March, 1983, Vol. 62, No. 3, Part 3. One of the functions of the TSPS system is to provide access to the data base system 140, for example, for the purposes of verifying the validity of a credit card number when a caller at one of the stations 112, 114 connected to the local exchange 110 makes a credit card call. The data base 140 is a national data base and accessible from a large number of local exchanges via associated TSPS. Customarily a number of local exchanges 110 are connected to a single TSPS 120 and a number of TSPS have access to a single data base system 140 via a national network using common channel interoffice signaling (CCIS). Such a network is described in *The Bell System Technical Journal*, September, 1982, Vol. 61, No. 7, Part 3.

In this illustrative embodiment of the invention, the data base 140 contains information regarding the service features of the system to which subscribers have subscribed. To use the features at a remote location, a subscriber provides the local exchange with a special code and an identification number which causes the exchange to consult a data base 140 via TSPS 120, retrieve the data defining the features for the calling subscriber and store the data in a local memory 111. In this illustrative embodiment, the data base field, in addition to the credit card number, contains a word defining features to which the credit card subscriber is entitled as well as data defining speed calling numbers. Speed calling, also referred to as abbreviated dialing, is a special feature whereby a subscriber dials a couple of digits which is interpreted by the local exchange to represent a full 10 digit telephone number. Such a data field layout is shown in FIG. 2. The data base may also contain the identity of the customer's preferred long distance carrier, to be used in making long distance calls from a remote location. FIG. 2 depicts an information field column defining the data stored in the data base, and a content column. The same data stored in the data base may also be stored on magnetic material on a personalized card, such as a credit card. Such a card may be read by a known card reading telephone terminal and transmitted to the local exchange in a well-known manner and stored in the memory of the local exchange. The feature validity field shown in FIG. 2 is coded in binary and in this embodiment comprises 8 bits or 1 byte. FIG. 3 further identifies the bits of the feature validity field. As indicated in FIG. 3, the first bit of the feature validity field indicates whether or not the subscriber is entitled to have features transferred to a remote location. The second through eighth bit, in this particular embodiment, indicate the specific features to which the calling subscriber has subscribed. In each case, the validity or entitlement of these features may be indicated by a 1 or a 0 in the appropriate bit position of the feature validity byte. The features listed in FIG. 3, other than the TEMPORARY OFFICE feature are standard services available to telephone subscribers. Numerous other features can be identified by the feature validity field. The TEMPORARY OFFICE feature is a feature which allows the subscriber to have all the other features listed in the feature field applied to the temporary location for a prescribed period of time.

SEQUENCE OF OPERATION

Figure 4:
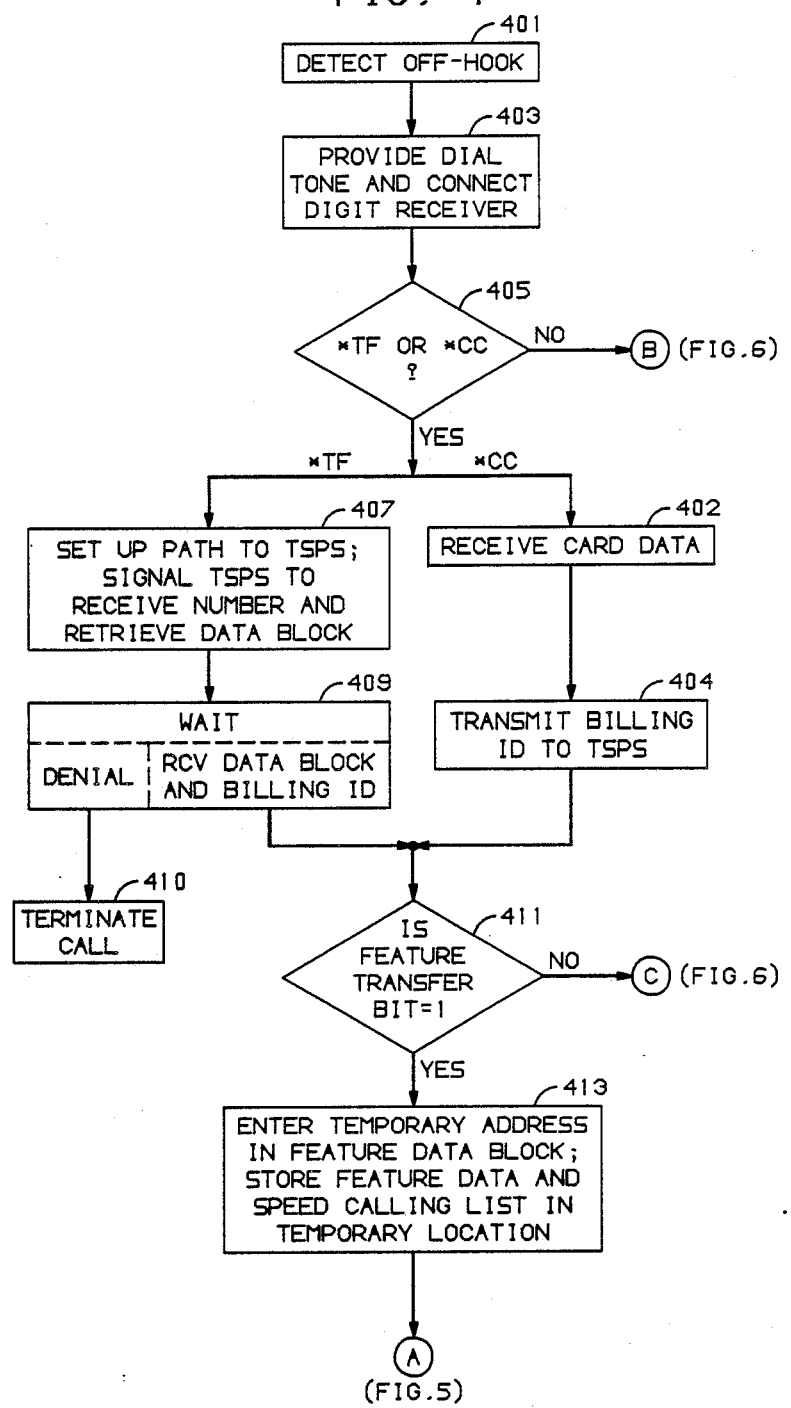
FIGS. 4, 5 and 6 are flow diagram representations of functions carried in the local exchange of FIG. 1.
Figure 5:
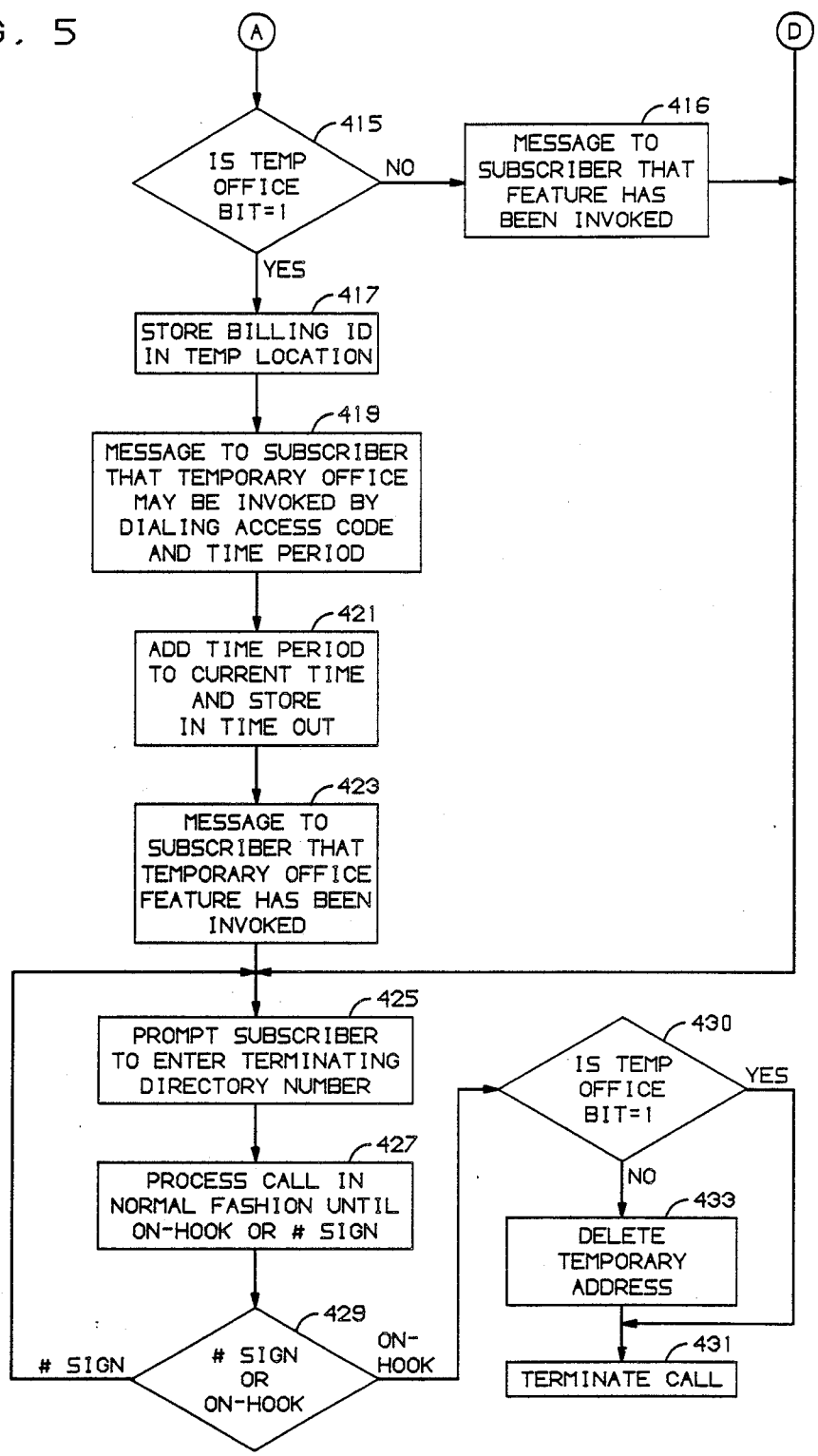
Figure 6:
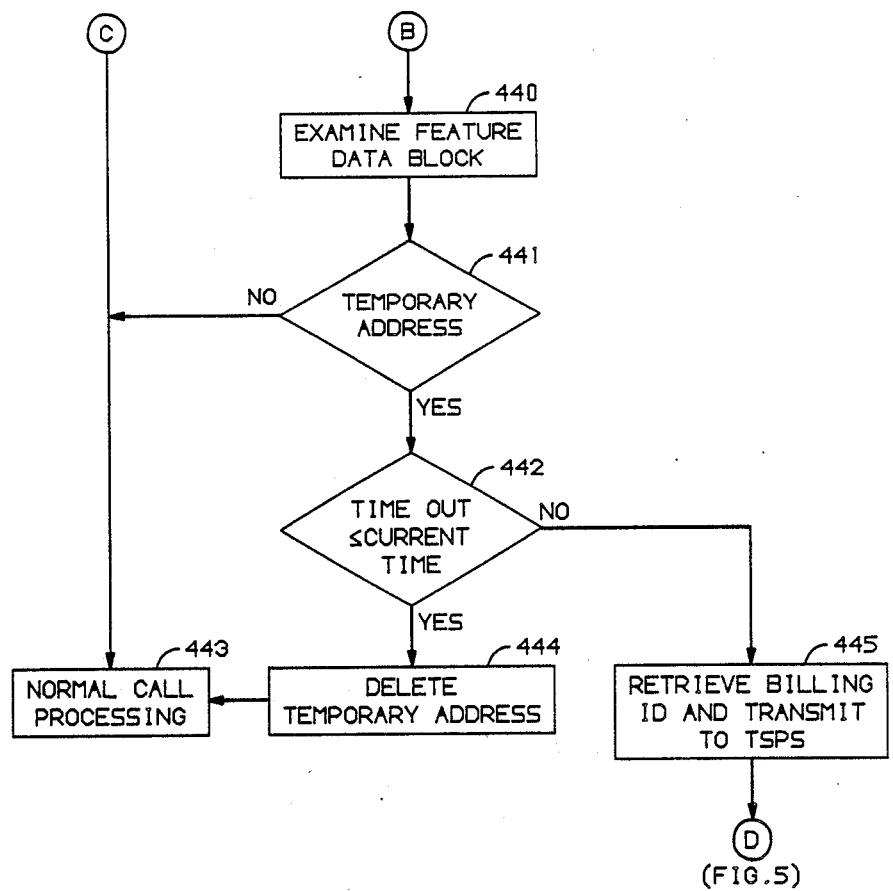

In this illustrative embodiment the feature transfer service is implemented by actions and interactions of several entities, including the local exchange 110, the TSPS 120 and the data base system 140. The systems comprise program controlled processors for carrying out the various functions. The processor in each of the systems may be, for example, the AT&T 3B20D processor described in the *Bell System Technical Journal*, January 1983, Volume 62, No. 1, Part 2. The functions to be performed for normal call handling by the local exchange 110 and the TSPS 120 are outlined in the above referenced *AT&T Technical Journal* on the 5ESS switch and the above referenced *Bell System Technical Journal* on TSPS No. 1B, respectively. A data base system, which may be used for the data base system 140 is described in the *Bell System Technical Journal*, September 1982, Volume 61, No. 1, Part 3, entitled "Stored Program Controlled Network". This journal describes a data base system together with a network system which makes the data base accessible from a number of TSPS and local exchanges. FIGS. 4 through 6 define, in flow-chart form, the program to be executed by the processor 113 of the local exchange in implementing the feature transfer service. As stated earlier, the local exchange 110 of the illustrative system includes a program controlled 5ESS switch controlled by a 3B20D program controlled processor. This processor operates under operating system programs derived from the well-known UNIX operating system, and described in the aforementioned January 1983 *Bell System Technical Journal*.

Referring to FIG. 4, block 401 depicts off-hook detection and 403 depicts the provision of dial tone and the connection of a digit receiver which are normal functions performed by a local exchange. In decision block 405 a test is made on the received digits to determine the existence of a special string which is referred to herein as *TF which signifies a request for transfer feature service or a string referred to as *CC which signifies a request to enter transfer features from a credit card. These characters are usually available on the telephone sets, if not, any other string may be substituted. Alternatively, a speech recognition unit (not shown in the drawing) could be provided to recognize a spoken request for service by the customer. When the *TF code is dialed, it is interpreted to mean that the subscriber desires to have personalized telephone features stored in the credit card data base made available to the line from which this call is originated. In the event that the *TF code is detected, the local exchange 110 sets up a path from the originating line to the TSPS 120 and alerts the TSPS to prepare to receive a credit card number. This is depicted in block 407. The TSPS, over the established path, may prompt the subscriber for the credit card number or other personal identification number or may wait for the subscriber to dial the number without a prompt. As an alternative to dialing the personal identification number, a subscriber may use a well-known card reading telephone 114 to enter the number. It is a function of the TSPS to transmit the received credit card number to the data base system 140. This is a well-known function commonly performed by the TSPS which does not need to be described herein in detail for an understanding of the invention. The data base system 140 responds to the receipt of the 14-digit credit card number from the TSPS by addressing a corresponding data item in the data base and retrieving the associated data block. The contents of the data block is outlined in FIGS. 2 and 3. As shown in FIG. 2, the first item of data block comprises the card number which may be used simply for checking purposes to ascertain that the proper data has been accessed. In the event that the card number is invalid or service is not authorized, a denial message is returned to the local exchange. The functions of the TSPS and the data base system and the retrieval of data and the checking are well-known functions which are commonly performed by such systems in connection with credit card calls, including the provision of a denial message. In the event that service is authorized, the data base system commonly returns an authorization message to the TSPS which responds by starting a billing record and by transmitting the authorization message and billing ID to the local exchange. In a system in accordance with this invention, the data base system transmits the retrieved data block to the TSPS and the TSPS in turn transmits the data block together with billing identification number, which may be the credit card number, to the local exchange. That the local exchange waits for the receipt of the data block and billing ID or a denial message is depicted in block 409. In a case of a denial the call may be terminated as indicated in block 410. Otherwise, an advance is made to block 411 where the FEATURE TRANSFER bit of the received data is examined to determine whether the subscriber is entitled to the feature transfer service. If not, normal call processing will be provided in a well-known manner. In the event the *CC characters are detected in block 405, an advance is made to block 402 to receive the card data transmitted from a card reading terminal and defining the desired feature set as depicted in FIGS. 2 and 3. Thereafter, the billing ID, or card number is transmitted to TSPS for billing purposes, as depicted in block 404. Subsequently, an advance is made to block 411 to examine the FEATURE TRANSFER bit of the received data.

If the subscriber is entitled to the feature transfer service, a temporary memory address is entered in the feature data block normally associated with the calling line and feature data, as defined by the remaining bits of the feature validity field, are stored together with the speed calling list in the memory location defined by the temporary address. These last named functions are depicted in block 413. A further test is made in block 415 in FIG. 5 to determine if the TEMPORARY OFFICE bit, bit 6 of the feature validity field, has been set. If not, a message is provided to the subscriber that the Feature Transfer feature has been invoked and the call is handled in a manner described later with respect to blocks 425 through 431. In the event that the test in block 415 indicates that the temporary office bit (bit 6) of the feature validity field has been set, the billing ID received from the TSPS in block 409 is stored in the temporary location created in block 413. Additionally, as indicated in block 419, a message is sent to the subscriber that the temporary office feature may be invoked by dialing an access code and a code indicating a time period. The message may be in the form of an audible message or tone signals generated in a well-known fashion. The local exchange, upon receiving the access code and time period indication, adds the received value of the time period to the system's current time and stores the computed value in a location in memory referred to herein as the time-out item. The local exchange includes a time clock 116 which provides system current time in a well-known fashion. In block 423 a message is provided to the subscriber that the temporary office feature has been invoked.

In block 425, after the transfer feature has been invoked, with or without the temporary office feature, the subscriber is prompted to enter the call signaling information, i.e., the number the subscriber wishes to reach. Thereafter the call is handled in a normal fashion including standard credit card billing until an on-hook is detected or the subscriber pushes the # sign. A test is made in block 429 to determine whether the # sign or on-hook sign was received. In the event it is the # sign, the sequence of blocks 425 through 429 is repeated, allowing the subscriber to make another call without going through the entire calling sequence. In the event that an on-hook sign has been received in block 427, an advance is made to block 430 to determine if the Temporary Office feature is in effect. If it is, the call is terminated in a normal feature in block 431; otherwise the temporary address is deleted in block 433 before the call is terminated. This deletion will disable the personalized feature from being used on subsequent calls.

Referring again to FIG. 4, in block 405 a test is made to determine if the *TF or *CC symbol was dialed by the subscriber. If so, the sequence described above is carried out; if not, the feature data block associated with the calling line in the local exchange is read as indicated in block 440 of FIG. 6 and a test is made in block 441 to determine if a temporary address exists in the feature block. If not, the call is processed in a normal fashion without reference to the transfer feature, as indicated in block 443. If a temporary address is found, it is taken as an indication that feature transfer was established previously. A further test is made, however, to determine whether the time period specified by the subscriber and recorded in block 421 has expired. In block 442 a test is made to determine if the value of the time-out item is less than or equal to the current time. If it is not, the billing ID is retrieved from the temporary location and transmitted to TSPS, as indicated in block 445, for use in billing the subsequent call. Thereafter, the subscriber is prompted to enter the terminating directory number, as indicated in block 425 in FIG. 5, and the sequence subsequent to block 425 is carried out. In the event that the test in block 442 indicates that the time-out value is not greater than the current time, the temporary address is deleted from the feature data block, as shown in block 444, and normal call processing is provided in block 443.

It is to be understood that the above described arrangement is merely illustrative of the application of the principles of the invention; numerous other arrangements may be devised by those skilled in the art without departing from the spirit and scope of the invention described herein. It is therefore intended that such changes or modifications be covered by the following claims.

What is claimed is:

1. A method of providing a set of previously subscribed personalized telephone features to a subscriber using a station terminal connected to a local exchange not equipped with said set of features for said station terminal, comprising the steps of:
   a. receiving from said subscriber at said station terminal a code representing a request for the use of said features at said local exchange and a personal identification number identifying the subscriber;
   b. retrieving from a data base feature data defining said set of previously subscribed features identified by said received personal identification number;
   c. recording said retrieved feature data defining said set of previously subscribed features in said local exchange in association with said station terminal;
   d. thereafter receiving from said subscriber at said local exchange call data defining a call; and
   e. providing telephone service to said station terminal in said local exchange by interpreting said received call associated data in said local exchange in accordance with said feature data defining said previously subscribed features recorded in said local exchange.

2. A method of providing personalized telephone features to a subscriber from any station of a plurality of independent telephone exchanges comprising the steps of:
   a. storing personal subscriber identification numbers in a data base accessible from all of said exchanges and storing feature data defining a set of predefined personalized telephone features in areas of said data base corresponding to said personal identification numbers;
   b. receiving from said subscriber at a station connected to one of said exchanges other than a station assigned to the subscriber, a code representing a request to use said feature data in said one exchange and one of said personal identification numbers;
   c. accessing said data base from said one exchange and retrieving from an area of said data base corresponding to said received personal identification number feature data defining the predefined set of personalized telephone features corresponding to said one received personal identification number;
   d. recording said retrieved feature data in said one exchange in association with said connected station;
   e. thereafter, receiving call originating data defining a call from said connected station at said one exchange; and
   f. providing telephone service to said connected station in said one exchange by interpreting said call originating data in accordance with said feature data recorded in said one exchange.

3. The method in accordance with claim 2 wherein said method further comprises the step of disabling further use of said feature data recorded in said one exchange in response to a call termination by said subscriber.

4. The method in accordance with claim 2 further comprising:
   receiving from said connected station data defining time; and
   providing telephone service in accordance with said feature data recorded in said exchange for a period of time defined by said data defining time.

5. A method of providing personalized presubscribed telephone features to a subscriber in a telecommunication system comprising a plurality of local exchanges having terminals connected thereto and a data base accessible from said plurality of exchanges for storing personalized feature data, comprising the steps of:
   a. receiving at one of said local exchanges from a subscriber at a selected one of said terminals a code representing a request to use said telephone features in said one exchange for future use by said subscriber;
   b. receiving a personal identification number identifying a subscriber, at said one exchange from said one terminal;
   c. accessing said data base from said one exchange with said personal identification number and retrieving from said data base at a location corresponding to said personal identification number feature data associated with said personal identification number defining presubscribed features of said identified subscriber;
   d. storing said feature data retrieved from said data base in said one local exchange in association with said one terminal;
   e. thereafter, receiving at said one exchange call signaling information from said one terminal defining a call; and
   f. interpreting said received call signaling information in accordance with said feature data stored in association with said one terminal to provide personalized service defined by said feature data stored in association with said one terminal.

6. The method in accordance with claim 5 and further comprising the step of disabling further use of said feature data stored in said one exchange in response to a call termination signal from said one terminal.

7. The method in accordance with claim 6 in a telecommunication system wherein said retrieved data is stored in memory, and further comprising the step of recording data indicating whether presubscribed feature data is present in said memory, examining said recorded data in response to a subsequent request for service from said one terminal and providing service features to said terminal defined by said retrieved data stored in said memory if said recorded data indicates that presubscribed feature data is present in said memory.

8. The method in accordance with claim 5 in a telecommunication system wherein said retrieved data is stored in memory and wherein said local exchange comprises timing means and the method further comprises the step of receiving from said one terminal data defining a time period and the step of preventing provision of service in accordance with said stored data in response to a subsequent request for service received after expiration of said time period.

9. The method in accordance with claim 5 wherein said feature data stored in said one local exchange comprises abbreviated dialing data and said method comprises the step of responding to call signaling associated with said one terminal defining an abbreviated dialing code and the step of completing a call to a directory number defined in said stored data in association with said abbreviated dialing code.

10. A data base system for use with a telephone exchange, said telephone exchange having telephone terminals connected thereto and having assigned telephone subscribers and equipped to complete telephone calls in response to external stimuli initiated from said terminals, said data base system comprising:
   storage means having a plurality of data storage areas corresponding to subscriber personal identification numbers, said storage areas for storing feature data defining presubscribed telephone features for subscribers not assigned to said telephone exchange, and
   means for connecting to said telephone exchange and responsive to signals from said exchange defining a personal identification number provided to said exchange by one of said subscribers not assigned to said exchange to retrieve from an area of said storage means corresponding to said personal identification number of said one subscriber and to transmit to said exchange feature data defining presubscribed features to be used in said exchange for completing telephone calls for said one subscriber.

11. A data base system in accordance with claim 10 wherein said feature data defining presubscribed telephone features includes a plurality of speed dialing numbers for each of said subscribers and telephone directory numbers corresponding to said speed dialing numbers.

12. A local telephone exchange comprising first connecting means for connecting to a plurality of telephone terminals, memory means for storing feature data associated with individual telephone terminals, second connecting means for connecting to a data base system and control means responsive to personal identification information received via said first connecting means from one of said telelphone terminals identifying a subscriber and a predetermined code representing a request to use personalized features at said exchange for transmitting said received personal identification information via said second connecting means to a data base system and responsive the receipt of feature data corresponding to said personal identification information from a data base system via said data base connection means to record said received feature data in said memory means in association with said one terminal and further responsive to subsequently received calling signals from said one telephone terminal to interpret said received calling signals in accordance with said feature data stored in association with said one telephone terminal to control said local exchange to provide telephone services in accordance with presubscribed features.

13. A telephone system for serving telephone subscribers comprising:
a local exchange having a plurality of terminals connected thereto and assigned to certain of said subscribers;
a data base system connected to said local exchange for storing subscriber feature data defining presubscribed telephone features in areas of said data base system corresponding to personal identification numbers of individual subscribers, and response to data retrieval signals from said local exchange identifying a subscriber to retrieve and transmit to said local exchange feature data defining presubscribed features for said identified subscriber;
said local exchange comprising memory means for storing in association with each of said terminals feature data defining features assigned to said terminals, and processor means responsive to a predetermined code representing a request to use personalized features at said local exchange and a personal identification number identifying a subscriber, received from one of said terminals, to transmit to said data base said data retrieval signals and said received personal identification number and to store in said memory means, in association with said one of said terminals, feature data transmitted from said data base, and further responsive to the receipt of calling signals from said one terminal to interpret said calling signals in accordance with said feature data stored in said memory in association with said one terminal for providing telephone service in said local exchange.

14. The telephone system in accordance with claim 13 wherein said local exchange further comprises clock means for generating timing signals and said processor means is responsive to signals defining a time period received from said one of said terminals and said timing signals to provide call handling service defined by said feature data stored in said memory means only for the period of time defined by said signals defining a period of time.

15. The local exchange in accordance with claim 13 wherein said received feature data includes speed dialing indicia and corresponding directory numbers and said processor means is responsive to said calling signals for controlling said local exchange to extend calls to said directory numbers.

16. The telephone system in accordance with claim 13, wherein said subscriber feature data includes a code identifying a long distance carrier previously selected by said identified subscriber and wherein said processor means is further responsive to said calling signals from said one terminal to provide telephone service by means of said identified long distance carrier.

17. A method of providing personalized communication services in a system comprising a plurality of local exchanges and a data base for supplying call feature data, comprising the steps of:
receiving at one of said local exchanges from a calling station served by said one local exchange a code representing a request for personalized communication services at said one local exchange and a personal identification number identifying a subscriber;
retrieving from said data base in response to said code feature data identified by said personal identification number and defining said personalized communication services;
recording said feature data defining said personalized communication services in said one local exchange in association with said station; and
thereafter providing telephone service to said station in said one exchange by interpreting in said one exchange call data defining calls pertaining to said one station in accordance with said feature data recorded in said one exchange.

* * * * *